(12) United States Patent
Lavoie et al.

(10) Patent No.: US 10,279,839 B2
(45) Date of Patent: May 7, 2019

(54) TRAILER BACKUP ASSIST REMOTE KNOB STATE MANAGEMENT

(71) Applicant: Ford Global Technologies, LLC, Dearborn, MI (US)

(72) Inventors: Erick Michael Lavoie, Dearborn, MI (US); Roger Arnold Trombley, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 150 days.

(21) Appl. No.: 15/131,558

(22) Filed: Apr. 18, 2016

(65) Prior Publication Data

US 2017/0297620 A1    Oct. 19, 2017

(51) Int. Cl.
*B62D 13/06* (2006.01)
*B62D 5/04* (2006.01)
*G06F 7/00* (2006.01)

(52) U.S. Cl.
CPC .............. *B62D 13/06* (2013.01); *B62D 5/04* (2013.01); *G06F 7/00* (2013.01)

(58) Field of Classification Search
CPC .............. B62D 13/06; B62D 5/04; G06F 7/00
USPC ...... 701/36, 41, 42; 280/477, 407, 402, 199; 345/156
See application file for complete search history.

(56) References Cited

U.S. PATENT DOCUMENTS

| | | |
|---|---|---|
| 3,944,972 A | 3/1976 | Chandler |
| 4,320,267 A | 3/1982 | Greve et al. |
| 4,518,044 A | 5/1985 | Wiegardt et al. |
| 4,848,499 A | 7/1989 | Martinet et al. |
| 4,947,097 A | 8/1990 | Tao |
| 5,261,495 A | 11/1993 | Szymczak |
| 5,270,689 A | 12/1993 | Hermann |
| 5,313,389 A | 5/1994 | Yasui |
| 5,359,165 A | 10/1994 | Leveque et al. |
| 5,430,261 A | 7/1995 | Malone |
| 5,436,413 A | 7/1995 | Katakami |
| 5,957,232 A | 9/1999 | Shimizu et al. |

(Continued)

FOREIGN PATENT DOCUMENTS

| | | |
|---|---|---|
| DE | 3923676 A1 | 1/1991 |
| DE | 3931518 A1 | 4/1991 |

(Continued)

OTHER PUBLICATIONS

Jae Il Roh, Hyunsuk Lee, Woojin Chung, "Control of a Car with a Trailer Using the Driver Assistance System", IEEE, International Conference on Robotics and Biomimetics, Dec. 7-11, 2011; Phuket, Thailand, pp. 2890-2895.

*Primary Examiner* — Peter D Nolan
*Assistant Examiner* — Wae L Louie
(74) *Attorney, Agent, or Firm* — Raymond Coppiellie; Price Heneveld LLP

(57) ABSTRACT

A steering input system for a trailer backup assist system includes an input apparatus having a housing and a user-manipulable input element coupled with the housing. The system further includes a controller determining a state of a use condition of the input apparatus and, based on the state of the use condition, one of implementing or disabling a trailer backup assist mode. The trailer backup assist mode generates a vehicle steering command based on an instantaneous position of the input element.

19 Claims, 13 Drawing Sheets

(56) References Cited

U.S. PATENT DOCUMENTS

| | | | |
|---|---|---|---|
| 6,389,342 B1 | 5/2002 | Kanda | |
| 6,601,386 B1 | 8/2003 | Hori et al. | |
| 6,636,197 B1* | 10/2003 | Goldenberg | G05G 1/02 345/156 |
| 6,750,406 B2 | 6/2004 | Komatsu et al. | |
| 7,038,667 B1 | 5/2006 | Vassallo et al. | |
| 7,085,634 B2* | 8/2006 | Endo | B60Q 1/48 180/199 |
| 7,191,865 B2 | 3/2007 | Spark | |
| 7,225,891 B2* | 6/2007 | Gehring | B62D 13/06 180/14.2 |
| 7,255,061 B2* | 8/2007 | Denton | G05G 1/105 116/286 |
| 7,309,075 B2* | 12/2007 | Ramsey | B60D 1/06 280/477 |
| 7,310,084 B2 | 12/2007 | Shitanaka et al. | |
| 7,315,299 B2 | 1/2008 | Sunda et al. | |
| 7,436,298 B2 | 10/2008 | Yuasa et al. | |
| 7,550,686 B2 | 6/2009 | Girke et al. | |
| 7,827,917 B1 | 11/2010 | Henderson | |
| 7,837,004 B2* | 11/2010 | Yasuda | B62D 5/0484 180/402 |
| 8,036,792 B2 | 10/2011 | Dechamp | |
| 8,138,865 B2 | 3/2012 | North et al. | |
| 8,519,948 B2* | 8/2013 | Cruz-Hernandez | G06F 3/016 345/156 |
| 8,755,984 B2 | 6/2014 | Rupp et al. | |
| 8,786,417 B2 | 7/2014 | Holmen et al. | |
| 8,798,860 B2 | 8/2014 | Dechamp | |
| 8,825,328 B2 | 9/2014 | Rupp et al. | |
| 8,909,426 B2 | 12/2014 | Rhode et al. | |
| 8,930,140 B2 | 1/2015 | Trombley et al. | |
| 8,972,109 B2 | 3/2015 | Lavoie et al. | |
| 9,033,284 B2 | 5/2015 | Van Staagen | |
| 9,102,271 B2 | 8/2015 | Trombley et al. | |
| 9,108,598 B2 | 8/2015 | Headley | |
| 9,132,856 B2 | 9/2015 | Shepard | |
| 9,164,955 B2 | 10/2015 | Lavoie et al. | |
| 9,187,124 B2 | 11/2015 | Trombley et al. | |
| 9,238,483 B2 | 1/2016 | Hafner et al. | |
| 9,248,858 B2 | 2/2016 | Lavoie et al. | |
| 9,315,212 B1 | 4/2016 | Kyrtsos et al. | |
| 9,321,483 B2 | 4/2016 | Headley | |
| 9,335,162 B2 | 5/2016 | Kyrtsos et al. | |
| 9,340,228 B2 | 5/2016 | Xu et al. | |
| 9,352,777 B2 | 5/2016 | Lavoie et al. | |
| 9,434,414 B2 | 9/2016 | Lavoie | |
| 2004/0093139 A1 | 5/2004 | Wildey et al. | |
| 2004/0189595 A1 | 9/2004 | Yuasa et al. | |
| 2005/0000738 A1 | 1/2005 | Gehring et al. | |
| 2006/0092129 A1 | 5/2006 | Choquet et al. | |
| 2007/0198190 A1 | 8/2007 | Bauer et al. | |
| 2008/0030361 A1 | 2/2008 | Peissner et al. | |
| 2008/0312792 A1 | 12/2008 | Dechamp | |
| 2009/0101429 A1 | 4/2009 | Williams | |
| 2009/0306854 A1 | 12/2009 | Dechamp | |
| 2010/0063670 A1 | 3/2010 | Brzezinski et al. | |
| 2010/0065344 A1* | 3/2010 | Collings, III | B60L 3/10 180/2.1 |
| 2010/0152989 A1 | 6/2010 | Smith et al. | |
| 2010/0222964 A1 | 9/2010 | Dechamp | |
| 2011/0149077 A1 | 6/2011 | Robert | |
| 2011/0160956 A1 | 6/2011 | Chung et al. | |
| 2012/0030626 A1 | 2/2012 | Hopkins et al. | |
| 2012/0087480 A1 | 4/2012 | Yang et al. | |
| 2012/0271512 A1 | 10/2012 | Rupp et al. | |
| 2012/0271514 A1 | 10/2012 | Lavoie et al. | |
| 2012/0271515 A1 | 10/2012 | Rhode et al. | |
| 2012/0271522 A1 | 10/2012 | Rupp et al. | |
| 2013/0006472 A1 | 1/2013 | McClain et al. | |
| 2013/0024064 A1 | 1/2013 | Shepard | |
| 2013/0158803 A1 | 6/2013 | Headley | |
| 2013/0158863 A1 | 6/2013 | Skvarce et al. | |
| 2013/0268160 A1* | 10/2013 | Trombley | B62D 13/06 701/42 |
| 2014/0052337 A1 | 2/2014 | Lavoie et al. | |
| 2014/0058614 A1 | 2/2014 | Trombley et al. | |
| 2014/0058622 A1 | 2/2014 | Trombley et al. | |
| 2014/0058655 A1 | 2/2014 | Trombley et al. | |
| 2014/0058668 A1 | 2/2014 | Trombley et al. | |
| 2014/0088797 A1 | 3/2014 | McClain et al. | |
| 2014/0156148 A1 | 6/2014 | Kikuchi | |
| 2014/0160276 A1 | 6/2014 | Pliefke et al. | |
| 2014/0172232 A1 | 6/2014 | Rupp et al. | |
| 2014/0188344 A1* | 7/2014 | Lavoie | B60W 30/00 701/41 |
| 2014/0188346 A1 | 7/2014 | Lavoie | |
| 2014/0210456 A1 | 7/2014 | Crossman | |
| 2014/0218506 A1 | 8/2014 | Trombley et al. | |
| 2014/0218522 A1 | 8/2014 | Lavoie et al. | |
| 2014/0222288 A1* | 8/2014 | Lavoie | G06F 17/00 701/41 |
| 2014/0236532 A1 | 8/2014 | Trombley et al. | |
| 2014/0249691 A1 | 9/2014 | Hafner et al. | |
| 2014/0267688 A1 | 9/2014 | Aich et al. | |
| 2014/0267689 A1 | 9/2014 | Lavoie | |
| 2014/0277942 A1 | 9/2014 | Kyrtsos et al. | |
| 2014/0297128 A1 | 10/2014 | Lavoie et al. | |
| 2014/0297129 A1 | 10/2014 | Lavoie et al. | |
| 2014/0303847 A1 | 10/2014 | Lavoie | |
| 2014/0309888 A1 | 10/2014 | Smit et al. | |
| 2014/0324295 A1 | 10/2014 | Lavoie | |
| 2014/0343795 A1* | 11/2014 | Lavoie | B62D 13/06 701/42 |
| 2014/0379217 A1 | 12/2014 | Rupp et al. | |
| 2015/0057903 A1 | 2/2015 | Rhode et al. | |
| 2015/0066296 A1 | 3/2015 | Trombley et al. | |
| 2015/0070161 A1 | 3/2015 | Mizuno et al. | |
| 2015/0120141 A1 | 4/2015 | Lavoie et al. | |
| 2015/0134183 A1 | 5/2015 | Lavoie et al. | |
| 2015/0138340 A1 | 5/2015 | Lavoie | |
| 2015/0158527 A1 | 6/2015 | Hafner et al. | |
| 2015/0203156 A1 | 7/2015 | Hafner et al. | |
| 2015/0204741 A1* | 7/2015 | Hagan | B60L 11/1809 180/11 |
| 2015/0210317 A1 | 7/2015 | Hafner et al. | |
| 2015/0217693 A1 | 8/2015 | Pliefke et al. | |
| 2016/0039456 A1 | 2/2016 | Lavoie et al. | |
| 2016/0059888 A1 | 3/2016 | Bradley et al. | |
| 2016/0059889 A1 | 3/2016 | Herzog et al. | |
| 2016/0096549 A1 | 4/2016 | Herzog et al. | |
| 2016/0129939 A1 | 5/2016 | Singh et al. | |
| 2016/0280267 A1 | 9/2016 | Lavoie et al. | |
| 2016/0304122 A1 | 10/2016 | Herzog et al. | |
| 2017/0297620 A1* | 10/2017 | Lavoie | B62D 13/06 |

FOREIGN PATENT DOCUMENTS

| | | |
|---|---|---|
| DE | 9208595 U1 | 8/1992 |
| DE | 10154612 A1 | 5/2003 |
| DE | 102005043467 A1 | 3/2007 |
| DE | 102006002294 A1 | 7/2007 |
| DE | 102008004160 A1 | 8/2009 |
| DE | 102009012253 A1 | 9/2010 |
| DE | 102010021052 A1 | 11/2011 |
| DE | 102010029184 A1 | 11/2011 |
| DE | 102013000198 A1 | 7/2014 |
| EP | 0418653 | 3/1991 |
| EP | 1653490 A1 | 5/2006 |
| EP | 1810913 A1 | 7/2007 |
| EP | 2388180 A2 | 11/2011 |
| EP | 1569073 B1 | 9/2014 |
| GB | 2398048 | 8/2004 |
| GB | 2398049 A | 8/2004 |
| GB | 2398050 A | 8/2004 |
| JP | 2003045269 A | 2/2003 |
| JP | 2003175852 A | 6/2003 |
| JP | 2007186118 A | 7/2007 |

(56) References Cited

FOREIGN PATENT DOCUMENTS

| | | | |
|---|---|---|---|
| KR | 20140105199 | A | 9/2014 |
| WO | 0044605 | A1 | 8/2000 |

* cited by examiner

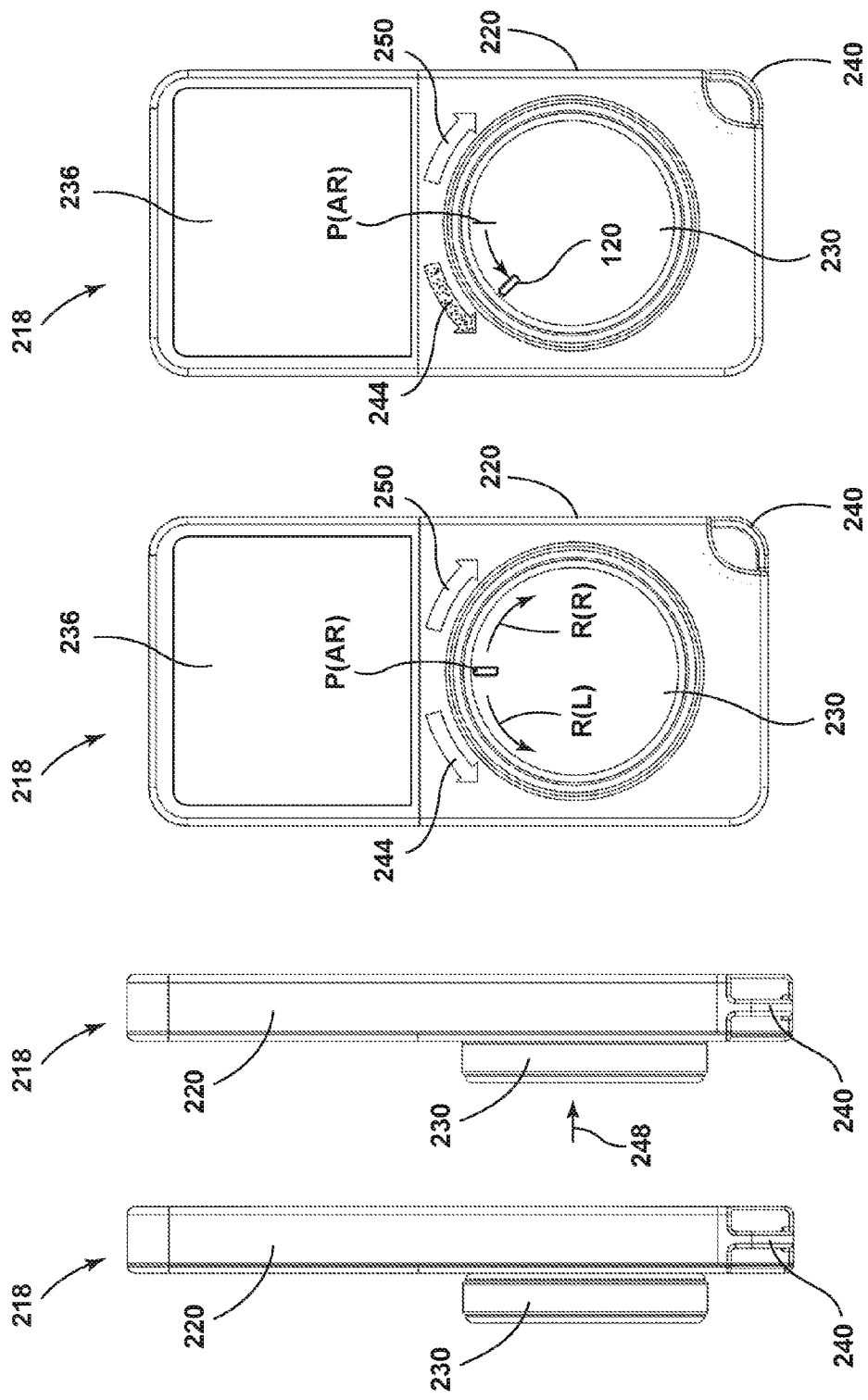

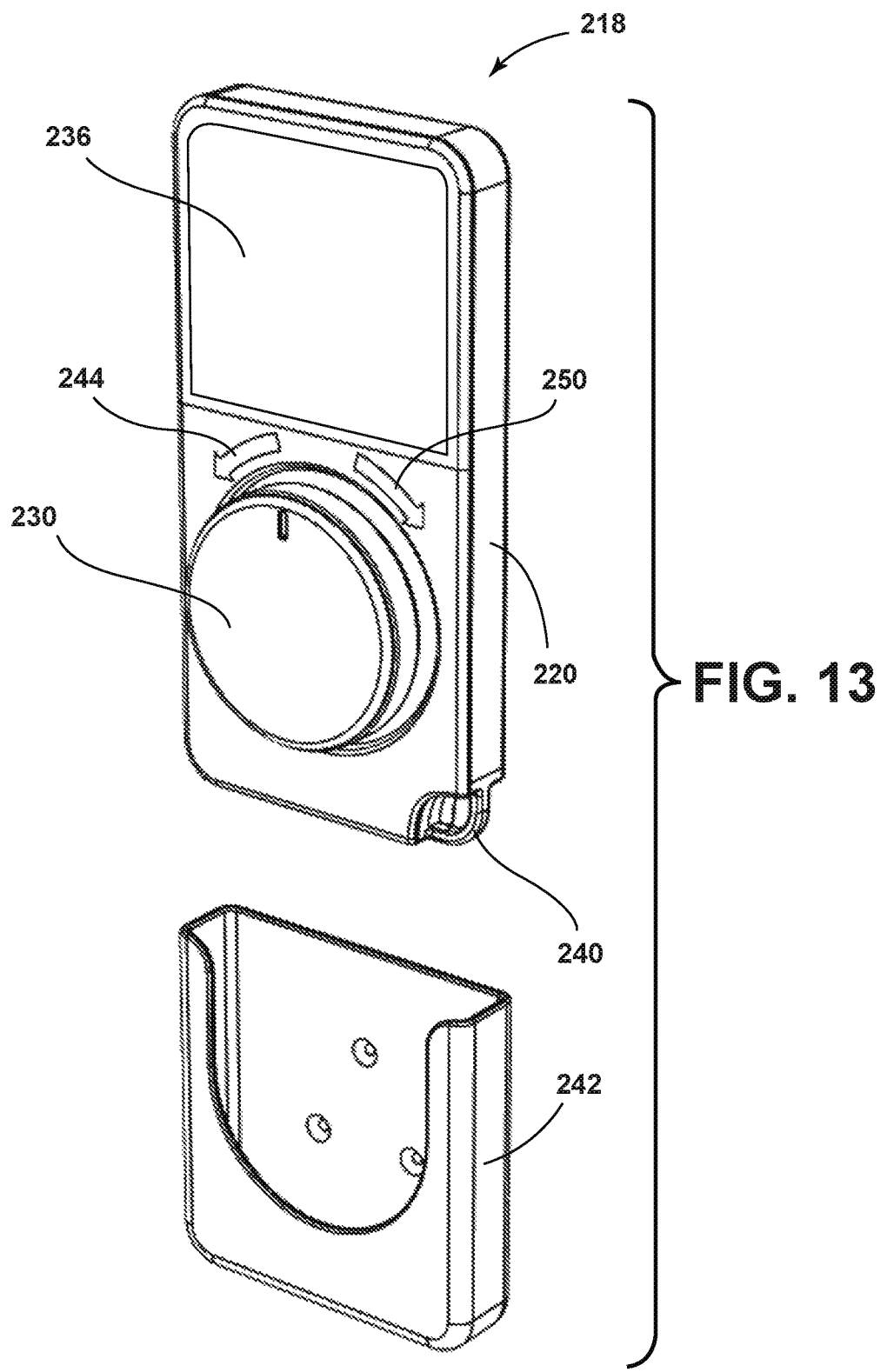

TRAILER BACKUP ASSIST REMOTE KNOB STATE MANAGEMENT

FIELD OF THE INVENTION

The disclosures made herein relate generally to steering assist technologies in vehicles and, more particularly, to trailer backup assist system having a remote rotatable driver interface for controlling a radius of curvature for a trailer path.

BACKGROUND OF THE INVENTION

It is well known that backing up a vehicle with a trailer attached is a difficult task for many drivers. This is particularly true for drivers that are untrained at backing with trailers such as, for example, those that drive with an attached trailer on an infrequent basis (e.g., have rented a trailer, use a personal trailer on an infrequent basis, etc). One reason for such difficulty is that backing a vehicle with an attached trailer requires counter-steering that is opposite to normal steering when backing the vehicle without a trailer attached and/or requires braking to stabilize the vehicle-trailer combination before a jack-knife condition occurs. Another such reason for such difficulty is that small errors in steering while backing a vehicle with an attached trailer are amplified thereby causing the trailer to depart from a desired path.

To assist the driver in steering a vehicle with trailer attached, a trailer backup assist system needs to know the driver's intention. One common assumption with known trailer backup assist systems is that a driver of a vehicle with an attached trailer wants to back up straight and the system either implicitly or explicitly assumes a zero curvature path for the vehicle-trailer combination. Unfortunately most of real-world use cases of backing a trailer involve a curved path and, thus, assuming a path of zero curvature would significantly limit usefulness of the system. Some known systems assume that a path is known from a map or path planner, which can result in such systems having a fairly complex human machine interface (HMI) and vehicle/trailer position determination.

Therefore, an approach for backing a trailer that provides a simple human machine interface and that overcomes other shortcomings of known trailer backup assist systems would be advantageous, desirable and useful.

SUMMARY OF THE INVENTION

According to one aspect of the present disclosure, a steering input system for a trailer backup assist system includes an input apparatus having a housing and a user-manipulable input element coupled with the housing. The system further includes a controller determining a state of a use condition of the input apparatus and, based on the state of the use condition, one of implementing or disabling a trailer backup assist mode. The trailer backup assist mode generates a vehicle steering command based on an instantaneous position of the input element.

According to another aspect of the present disclosure, a backup assist system for a vehicle reversing a trailer includes an input apparatus having a housing and a rotary element rotatably coupled with the housing. The system further includes a controller determining a state of a first use condition of the input apparatus and, based on the state of the use condition, one of implementing or disabling a trailer backup assist mode. The trailer backup assist mode generates a vehicle steering command based on an instantaneous position of the input element.

According to another aspect of the present disclosure, a method for assisting a vehicle in reversing a trailer includes determining a presence or absence of a disabling condition that may be one of a driver being absent from the vehicle or a battery charge level of an input apparatus being below a threshold. According to the disabling condition, the method includes respectively implementing or disabling a trailer backup assist mode. When implemented, the trailer backup assist mode generates a vehicle steering command based on an instantaneous position of an input element of the input apparatus.

These and other aspects, objects, and features of the present invention will be understood and appreciated by those skilled in the art upon studying the following specification, claims, and appended drawings.

BRIEF DESCRIPTION OF THE DRAWINGS

In the Drawings:

FIGS. 11A and 11B are sequential side views showing implementation of a control mode using the remote steering input apparatus of FIG. 10;

FIGS. 12A and 12B are sequential front views or the remote steering input apparatus of FIG.10 during use thereof in controlling a curvature path of a vehicle trailer combination;

FIG. 13 is an assembly view of the remote steering input apparatus of FIG.10 with a cradle;

DETAILED DESCRIPTION OF THE PREFERRED EMBODIMENTS

Figure 1:
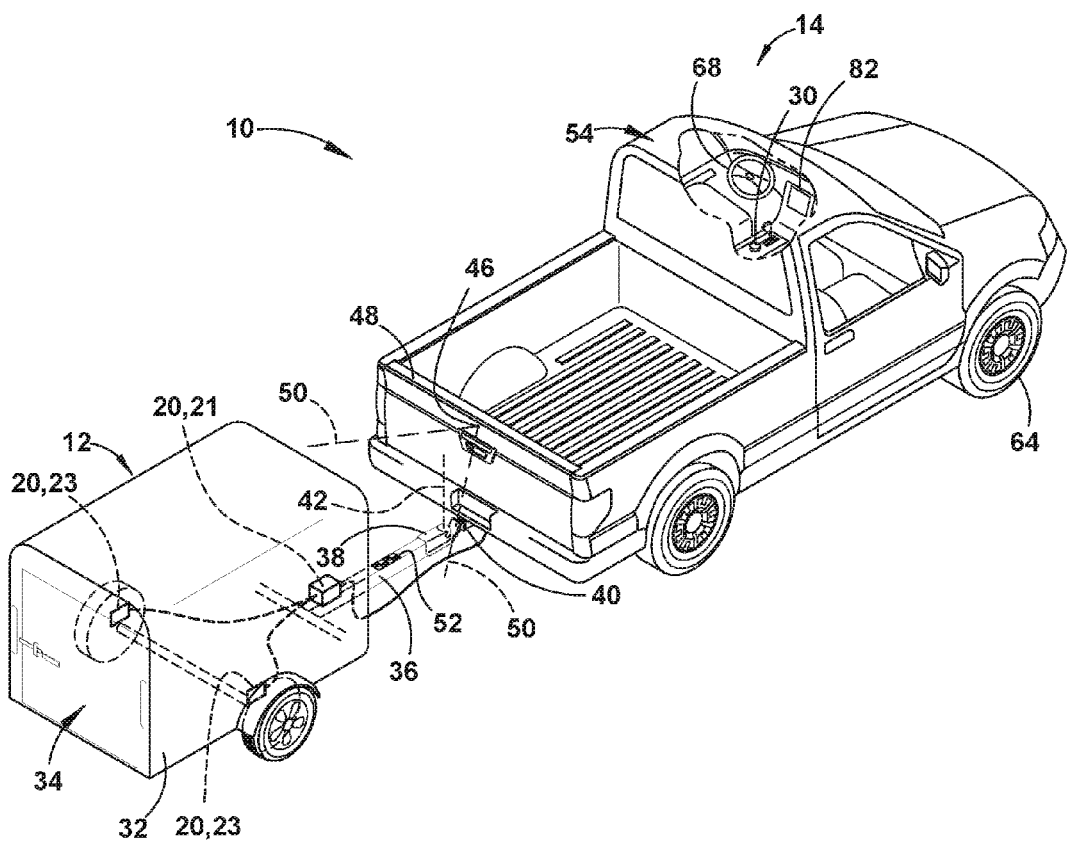
FIG. 1 is a top perspective view of a vehicle attached to a trailer with one embodiment of a hitch angle sensor for operating a trailer backup assist system.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1-12, reference numeral 10 generally designates a trailer backup assist system for controlling a backing path of a trailer 12 attached to a vehicle 14 by allowing a driver of the vehicle 14 to specify a desired curvature 26 of the backing path of the trailer 12. In one embodiment, the trailer backup assist system 10 automatically steers the vehicle 14 to guide the trailer 12 on the desired curvature or backing path 26 as a driver uses the accelerator and brake pedals to control the reversing speed of the vehicle 14. To monitor the position of the trailer 12 relative to the vehicle 14, the trailer backup assist system 10 may include a sensor system 16 that senses or otherwise determines a hitch angle γ between the trailer 12 and the vehicle 14. In one embodiment, the sensor system 16 may include a sensor module 20 attached to the trailer 12 that monitors the dynamics of the trailer 12, such as yaw rate, and communicates with a controller 28 of the trailer backup assist system 10 to determine the instantaneous hitch angle γ. Accordingly, one embodiment of a sensor module 20 is adapted to attach to the trailer 12 and generate a trailer yaw rate $\omega_2$. The trailer backup assist system 10 according to such an embodiment may also include a vehicle sensor system 16 that generates a vehicle yaw rate $\omega_1$ and a vehicle speed $v_1$. The controller 28 of the trailer backup assist system 10 may thereby estimates a hitch angle γ based on the trailer yaw rate $\omega_2$, the vehicle yaw rate $\omega_1$, and the vehicle speed $v_1$ in view of a kinematic relationship between the trailer 12 and the vehicle 14. In another embodiment, the sensor system 16 may include a hitch angle sensor 44, such as a vision-based system that employs a camera 46 on the vehicle 14 to monitor a target 52 on the trailer 12 to determine the hitch angle γ and thereby further increase reliability of the overall estimated hitch angle γ.

With respect to the general operation of the trailer backup assist system 10, a steering input device 18 may be provided, such as a rotatable knob 30, for a driver to provide the desired curvature 26 of the trailer 12. As such, the steering input device 18 may be operable between a plurality of selections, such as successive rotated positions of a knob 30, that each provide an incremental change to the desired curvature 26 of the trailer 12. Upon inputting the desired curvature 26, the controller may generate a steering command for the vehicle 14 to guide the trailer 12 on the desired curvature 26 based on the estimated hitch angle γ and a kinematic relationship between the trailer 12 and the vehicle 14. Therefore, the accuracy of the hitch angle estimation is critical to operating the trailer backup assist system 10. However, it is appreciated that such a system for instantaneously estimating hitch angle may be used in association with additional or alternative vehicle features, such as trailer sway monitoring.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

Still referring to FIG. 1, the sensor system 16 in the illustrated embodiment includes both a sensor module 20 and a vision-based hitch angle sensor 44 for estimating the hitch angle γ between the vehicle 14 and the trailer 12. The illustrated hitch angle sensor 44 employs a camera 46 (e.g. video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, energy transducers of a reverse aid system, a blind spot system, and/or a cross traffic alert system, and other conceivable sensors or indicators of the hitch angle γ to supplement or be used in place of the vision-based hitch angle sensor 44.

The embodiment of the sensor module 20 illustrated in FIG. 1 includes a housed sensor cluster 21 mounted on the tongue 36 of the trailer 12 proximate the enclosed cargo area 34 and includes left and right wheel speed sensors 23 on laterally opposing wheels of the trailer 12. It is conceivable that the wheel speed sensors 23 may be bi-directional wheel speed sensors for monitoring both forward and reverse speeds. Also, it is contemplated that the sensor cluster 21 in additional embodiments may be mounted on alternative portions of the trailer 12.

The sensor module 20 generates a plurality of signals indicative of various dynamics of the trailer 12. The signals may include a yaw rate signal, a lateral acceleration signal, and wheel speed signals generated respectively by a yaw rate sensor 25, an accelerometer 27, and the wheel speed sensors 23. Accordingly, in the illustrated embodiment, the yaw rate sensor 25 and the accelerometer 27 are contained within the housed sensor cluster 21 although other configurations are conceivable. It is conceivable that the accelerometer 27, in some embodiments, may be two or more separate sensors and may be arranged at an offset angle, such as two sensors arranged at plus and minus forty-five degrees from the longitudinal direction of the trailer or arranged parallel with the longitudinal and lateral directions of the trailer, to generate a more robust acceleration signal. It is also contemplated that these sensor signals could be compensated and filtered to remove offsets or drifts, and smooth out noise. Further, the controller 28 may utilize processed signals received outside of the sensor system 16, including standard signals from the brake control system 72 and the power assist steering system 62, such as vehicle yaw rate $\omega_1$, vehicle speed $v_1$, and steering angle δ, to estimate the trailer hitch angle γ, trailer speed, and related trailer parameters. As described in more detail below, the controller 28 may estimate the hitch angle γ based on the trailer yaw rate $\omega_2$, the vehicle yaw rate $\omega_1$, and the vehicle speed $v_1$ in view of a kinematic relationship between the trailer 12 and the vehicle 14. The controller 28 of the trailer backup assist system 10 may also utilize the estimated trailer variables and trailer parameters to control the steering system 62, brake control system 72, and the powertrain control system 74, such as to assist backing the vehicle-trailer combination or to mitigate a trailer sway condition.

Figure 2:
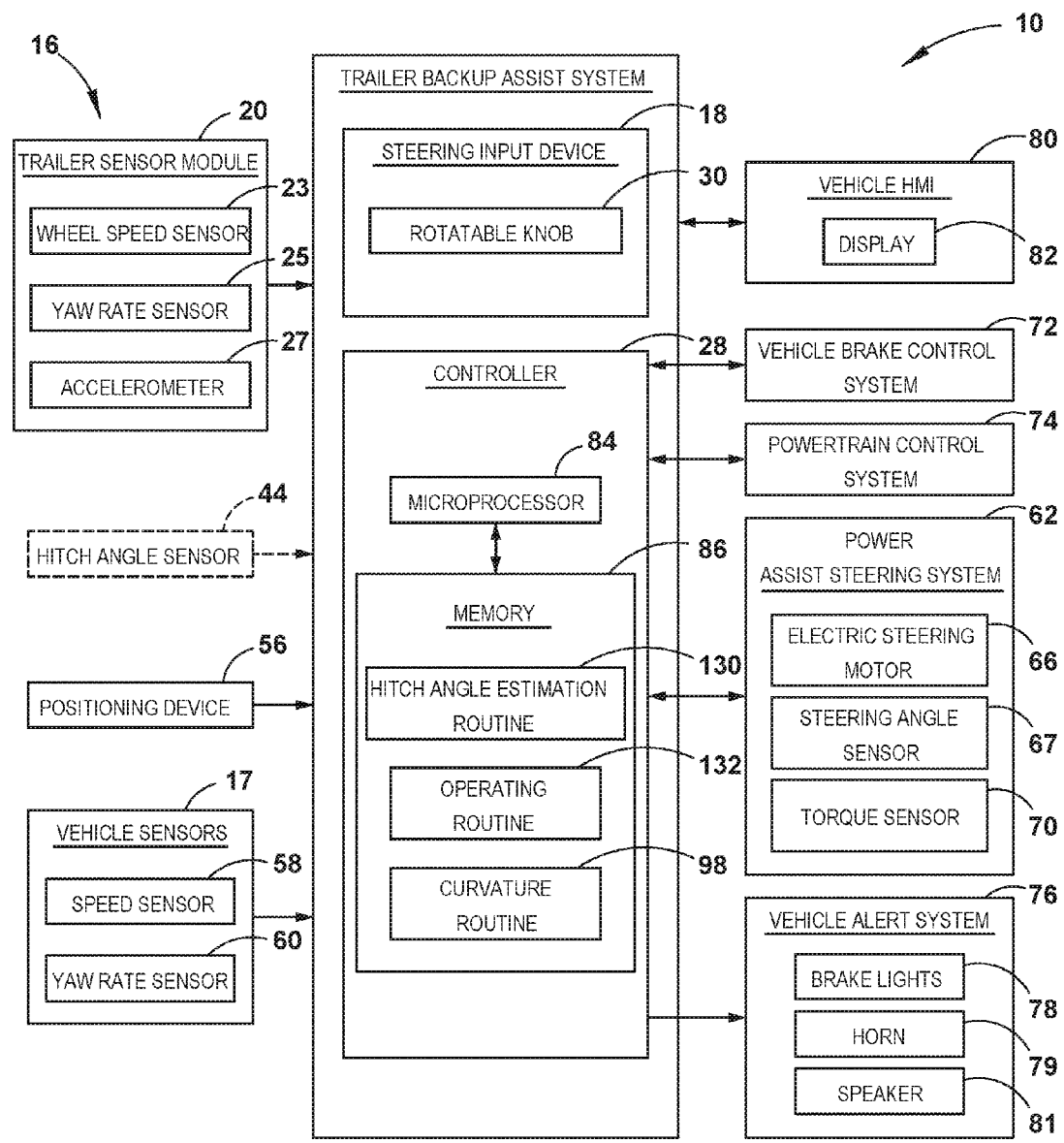
FIG. 2 is a block diagram illustrating one embodiment of the trailer backup assist system having a steering input device, a curvature controller, and a trailer braking system.

With reference to the embodiment of the trailer backup assist system 10 shown in FIG. 2, the hitch angle sensor 44 is provided in dashed lines to illustrate that in some embodiments it may be omitted when the trailer sensor module 20 is provided. The illustrated embodiment of the trailer backup assist system 10 receives vehicle and trailer status-related information from additional sensors and devices. This information includes positioning information from a positioning device 56, which may include a global positioning system (GPS) on the vehicle 14 or a handheld device, to determine a coordinate location of the vehicle 14 and the trailer 12 based on the location of the positioning device 56 with respect to the trailer 12 and/or the vehicle 14 and based on the estimated hitch angle γ. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a yaw rate sensor 60. It is contemplated that in additional embodiments, the hitch angle sensor 44 and other vehicle sensors and devices may provide sensor signals or other information, such as proximity sensor signals or successive images of the trailer 12, that the controller of the trailer backup assist system 10 may process with various routines to determine an indicator of the hitch angle γ, such as a range of hitch angles.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature 26 of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Referring again to the embodiment illustrated in FIG. 2, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle, in addition to other vehicle 14 and trailer 12 conditions to guide the trailer 12 along the desired curvature 26. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative or in addition to the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and an indication of the estimated hitch angle on the display 82. In addition, the portable device may provide feedback information, such as visual, audible, and tactile alerts.

As further illustrated in FIG. 2, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path of travel of the trailer 12 for the controller 28 to process and generate steering commands. More specifically, the steering input device 18 may provide a selection or positional information that correlates with a desired curvature 26 of the desired backing path of travel of the trailer 12. Also, the trailer steering commands provided by the steering input device 18 can include information relating to a commanded change in the path of travel, such as an incremental change in the desired curvature 26, and information relating to an indication that the trailer 12 is to travel along a path defined by a longitudinal centerline axis of the trailer 12, such as a desired curvature value of zero that defines a substantially straight path of travel for the trailer. As will be discussed below in more detail, the steering input device 18 according to one embodiment may include a movable control input device for allowing a driver of the vehicle 14 to command desired trailer steering actions or otherwise select and alter a desired curvature. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature 26 or other information defining a desired backing path, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, the trailer braking system, the powertrain control system 74, and other vehicle sensors and devices. The controller 28 may generate vehicle steering information and commands as a function of all or a portion of the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a hitch angle estimation routine 130, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 3:
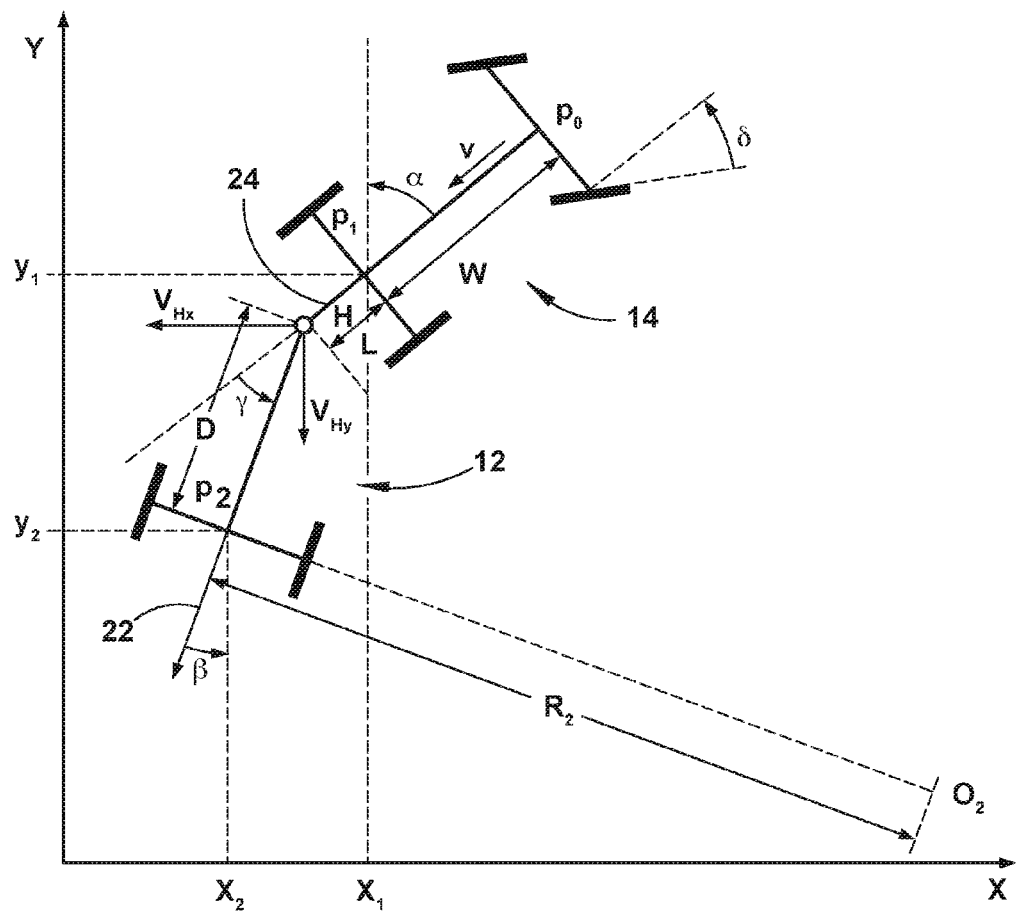
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

δ: steering angle at steered front wheels of the vehicle;
α: yaw angle of the vehicle;
β: yaw angle of the trailer;
γ: hitch angle (γ=β−α);
W: wheel base of the vehicle;
L: drawbar length between hitch point and rear axle of the vehicle;
D: distance (trailer length) between hitch point and axle of the trailer or effective axle for a multiple axle trailer; and
$r_2$: curvature radius for the trailer.

One embodiment of a kinematic relationship between trailer path radius of curvature $r_2$ at the midpoint of an axle of the trailer 12, steering angle δ of the steered wheels 64 of the vehicle 14, and the hitch angle γ can be expressed in the equation provided below. As such, if the hitch angle γ is provided, the trailer path curvature $\kappa_2$ can be controlled based on regulating the steering angle δ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via the steering input device Through the use of the equation for providing steering angle, a corresponding steering command can be generated by the curvature routine 98 for controlling the power assist steering system 62 of the vehicle 14.

In an additional embodiment, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 4:
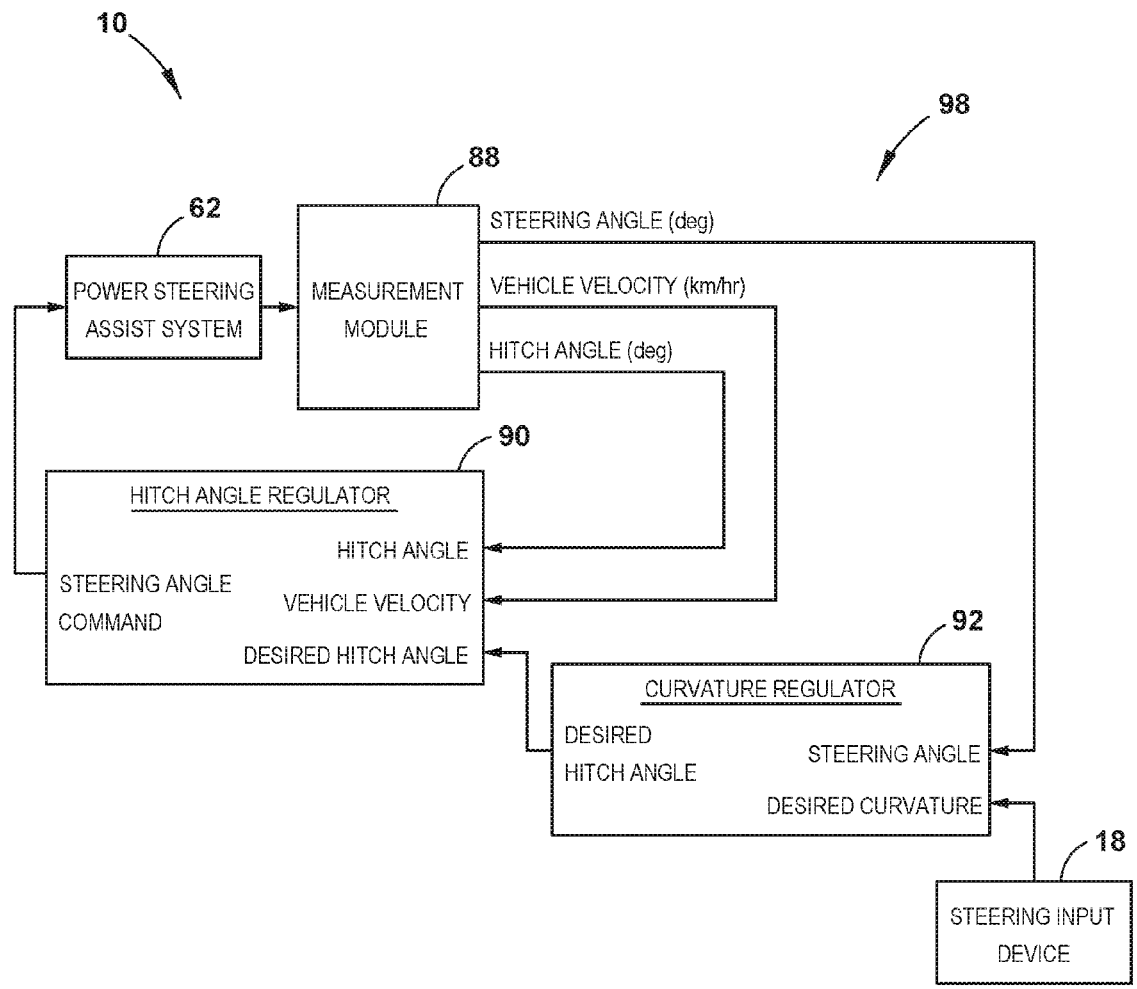
FIG. 4 is a schematic block diagram illustrating portions of a curvature controller, according to an additional embodiment, and other components of the trailer backup assist system, according to such an embodiment.

Yet another embodiment of the curvature routine 98 of the trailer backup assist system 10 is illustrated in FIG. 4, showing the general architectural layout whereby a measurement module 88, a hitch angle regulator 90, and a curvature regulator 92 are routines that may be stored in the memory 86 of the controller 28. In the illustrated layout, the steering input device 18 provides a desired curvature $\kappa_2$ value to the curvature regulator 92 of the controller 28, which may be determined from the desired backing path 26 that is input with the steering input device The curvature regulator 92 computes a desired hitch angle γ(d) based on the current desired curvature $\kappa_2$ along with the steering angle δ provided by a measurement module 88 in this embodiment of the controller 28. The measurement module 88 may be a memory device separate from or integrated with the controller 28 that stores data from sensors of the trailer backup assist system 10, such as the hitch angle sensor 44, the vehicle speed sensor 58, the steering angle sensor, or alternatively the measurement module 88 may otherwise directly transmit data from the sensors without functioning as a memory device. Once the desired hitch angle γ(d) is computed by the curvature regulator 92 the hitch angle regulator 90 generates a steering angle command based on the computed desired hitch angle γ(d) as well as a measured or otherwise estimated hitch angle γ(m) and a current velocity of the vehicle 14. The steering angle command is supplied to the power assist steering system 62 of the vehicle 14, which is then fed back to the measurement module 88 to reassess the impacts of other vehicle characteristics impacted from the implementation of the steering angle command or other changes to the system. Accordingly, the curvature regulator 92 and the hitch angle regulator 90 continually process information from the measurement module 88 to provide accurate steering angle commands that place the trailer 12 on the desired curvature $\kappa_2$ and the desired backing path 26, without substantial overshoot or continuous oscillation of the path of travel about the desired curvature $\kappa_2$.

Specifically, entering the control system is an input, $\kappa_2$, which represents the desired curvature 26 of the trailer 12 that is provided to the curvature regulator 92. The curvature regulator 92 can be expressed as a static map, $p(\kappa_2, \delta)$, which in one embodiment is the following equation:

$$p(\kappa_2, \delta) = \tan^{-1}\left(\frac{\kappa_2 D + L\tan(\delta)}{\kappa_2 DL\tan(\delta) - W}\right)$$

where, $\kappa_2$ represents the desired curvature of the trailer 12 or $1/r_2$ as shown in FIG. 3;

δ represents the steering angle;

L represents the distance from the rear axle of the vehicle 14 to the hitch pivot point;

D represents the distance from the hitch pivot point to the axle of the trailer 12; and W represents the distance from the rear axle to the front axle of the vehicle 14.

The output hitch angle of $p(\kappa_2, \delta)$ is provided as the reference signal, $\gamma_{ref}$, for the remainder of the control system, although the steering angle δ value used by the curvature regulator 92 is feedback from the non-linear function of the hitch angle regulator 90. It is shown that the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(u - \frac{v}{D}\sin(\gamma)\right)\right)$$

The feedback control law, $g(u, \gamma, v)$, is implemented with a proportional integral (PI) controller, whereby the integral portion substantially eliminates steady-state tracking error. More specifically, the control system illustrated in FIG. 5 may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{W}\bar{\delta}$$

$$\tan(\delta) = \bar{\delta} = \frac{W}{v(t)\left(1 + \frac{L}{D}\cos(\gamma(t))\right)}\left(K_P(p(\kappa_2, \delta) - \gamma(t)) - \frac{v(t)}{D}\sin(\gamma(t))\right)$$

It is contemplated that the PI controller may have gain terms based on trailer length D since shorter trailers will generally have faster dynamics. In addition, the hitch angle regulator 90 may be configured to prevent the desired hitch angle γ(d) to reach or exceed a jackknife angle γ(j), as computed by the controller or otherwise determined by the trailer backup assist system 10, as disclosed in greater detail herein.

Figure 5:
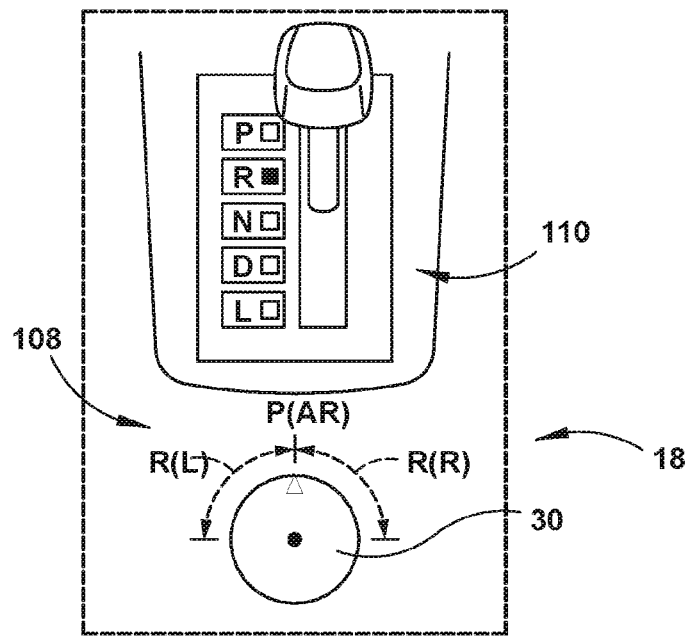
FIG. 5 is a plan view of a steering input device having a rotatable knob for operating the trailer backup assist system, according to one embodiment.

Referring now to FIG. 5, one embodiment of the steering input device 18 is illustrated disposed on a center console 108 of the vehicle 14 proximate a shifter 110. In this embodiment, the steering input device 18 includes a rotatable knob 30 for providing the controller 28 with the desired backing path of the trailer 12. More specifically, the angular position of the rotatable knob 30 may correlate with a desired curvature, such that rotation of the knob to a different angular position provides a different desired curvature with an incremental change based on the amount of rotation and, in some embodiments, a normalized rate, as described in greater detail herein.

Figure 6:
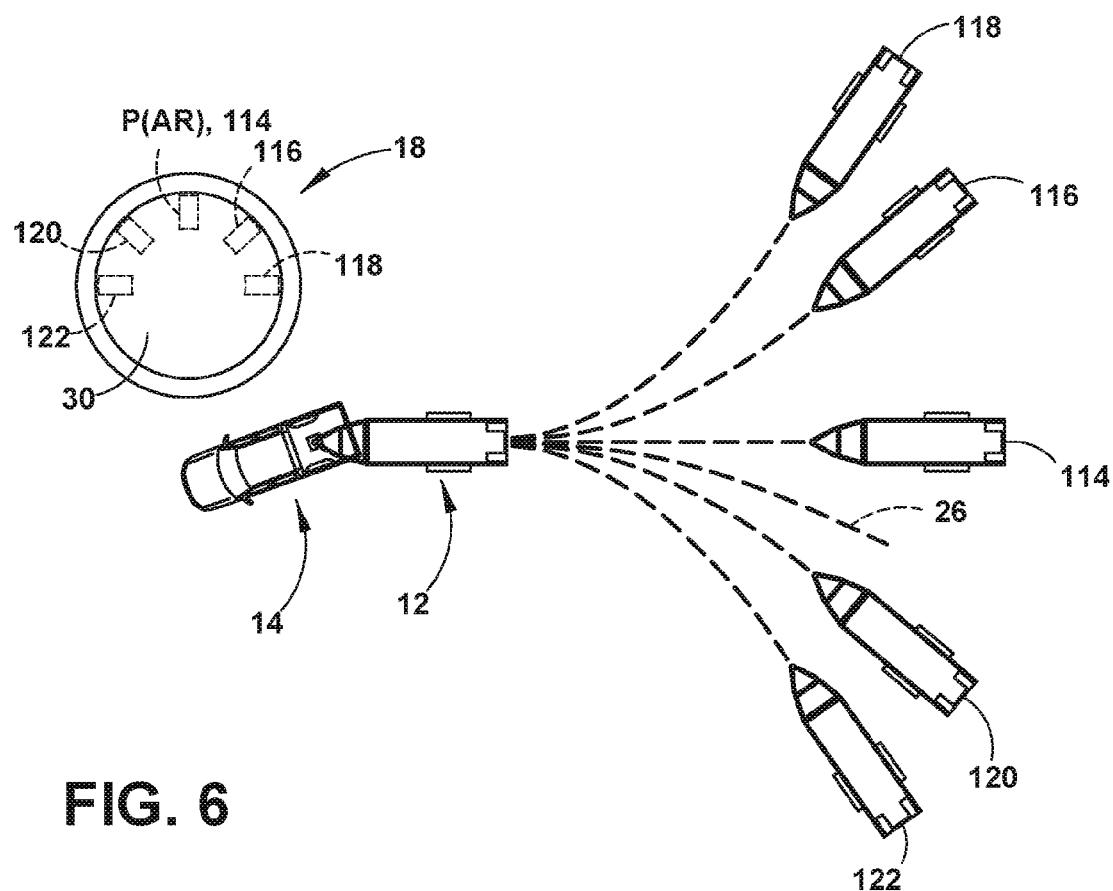
FIG. 6 is a plan view of another embodiment of a rotatable knob for selecting a desired curvature of a trailer and a corresponding schematic diagram illustrating a vehicle and a trailer with various trailer curvature paths correlating with desired curvatures that may be selected.

The rotatable knob 30, as illustrated in FIG. 6, may be biased (e.g., by a spring return) to a center, or at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 30, a torque that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) and a direction of movement of the rotatable knob 30 with respect to the at-rest position P(AR), which itself may correspond to a zero-curvature command. It is also contemplated that the rate of rotation of the rotatable knob 30 may also be used to determine the desired curvature 26 output to the controller 28. The at-rest position P(AR) of the knob corresponds to a signal indicating that the vehicle 14 should be steered such that the trailer 12 is backed along a substantially straight backing path 114 (FIG. 6) (zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 in the corresponding direction that is possible without the corresponding vehicle steering information causing a jackknife condition.

As shown in FIG. 6, a driver can turn the rotatable knob 30 to provide a desired curvature 26 while the driver of the vehicle 14 backs the trailer 12. In the illustrated embodiment, the rotatable knob 30 rotates about a central axis between a center or middle position 114 corresponding to a substantially straight backing path 26 of travel, as defined by the longitudinal direction 22 of the trailer 12, and various rotated positions 116, 118, 120, 122 on opposing sides of the middle position 114, commanding a desired curvature 26 corresponding to a radius of the desired backing path of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position.

Figure 7:
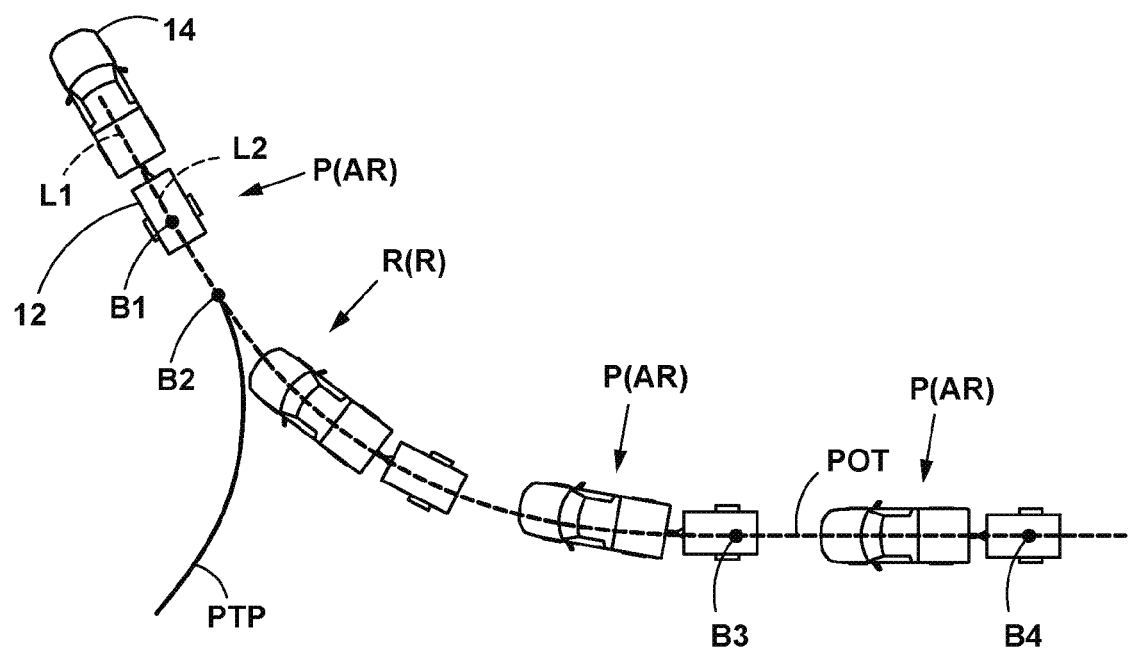
FIG. 7 is a schematic diagram showing a backup sequence of a vehicle and a trailer implementing various curvature selections with the trailer backup assist system, according to one embodiment.

Referring to FIG. 7, an example is shown in which the steering input device 18 is used for dictating a curvature of a desired backing path of travel (POT) of the trailer 12 while backing up the trailer 12 with the vehicle 14. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position within clockwise rotation range R(R)). Accordingly, the trailer backup assist system 10 will steer the vehicle 14 in a manner determined for causing the trailer 12 to be steered to the right as a function of an amount of rotation of the rotatable knob 30 with respect to the at-rest position P(AR), a rate movement of the knob 30 (FIG. 5), and/or a direction of movement of the knob with respect to the at-rest position P(AR). Similarly, the trailer 12 can be commanded to steer to the left by rotating the rotatable knob 30 to the left.

When the trailer 12 reaches backup position B3, the driver allows the rotatable knob 30 to return to the at-rest position P(AR) thereby causing the trailer backup assist system 10 to steer the vehicle 14 in a manner determined to cause the trailer 12 to be backed into and along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4.

In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob 30 is in/returned to the at-rest position P(AR).

In the embodiment illustrated in FIG. 7, in order to activate the trailer backup assist system 10, the driver interacts with the trailer backup assist system 10 and the automatically steers as the driver reverses the vehicle 14. As discussed above, the driver may command the trailer backing path by using a steering input device 18 and the controller 28 may determine the vehicle steering angle to achieve the desired curvature 26, whereby the driver controls the throttle and brake while the trailer backup assist system 10 controls the steering.

Figure 8:
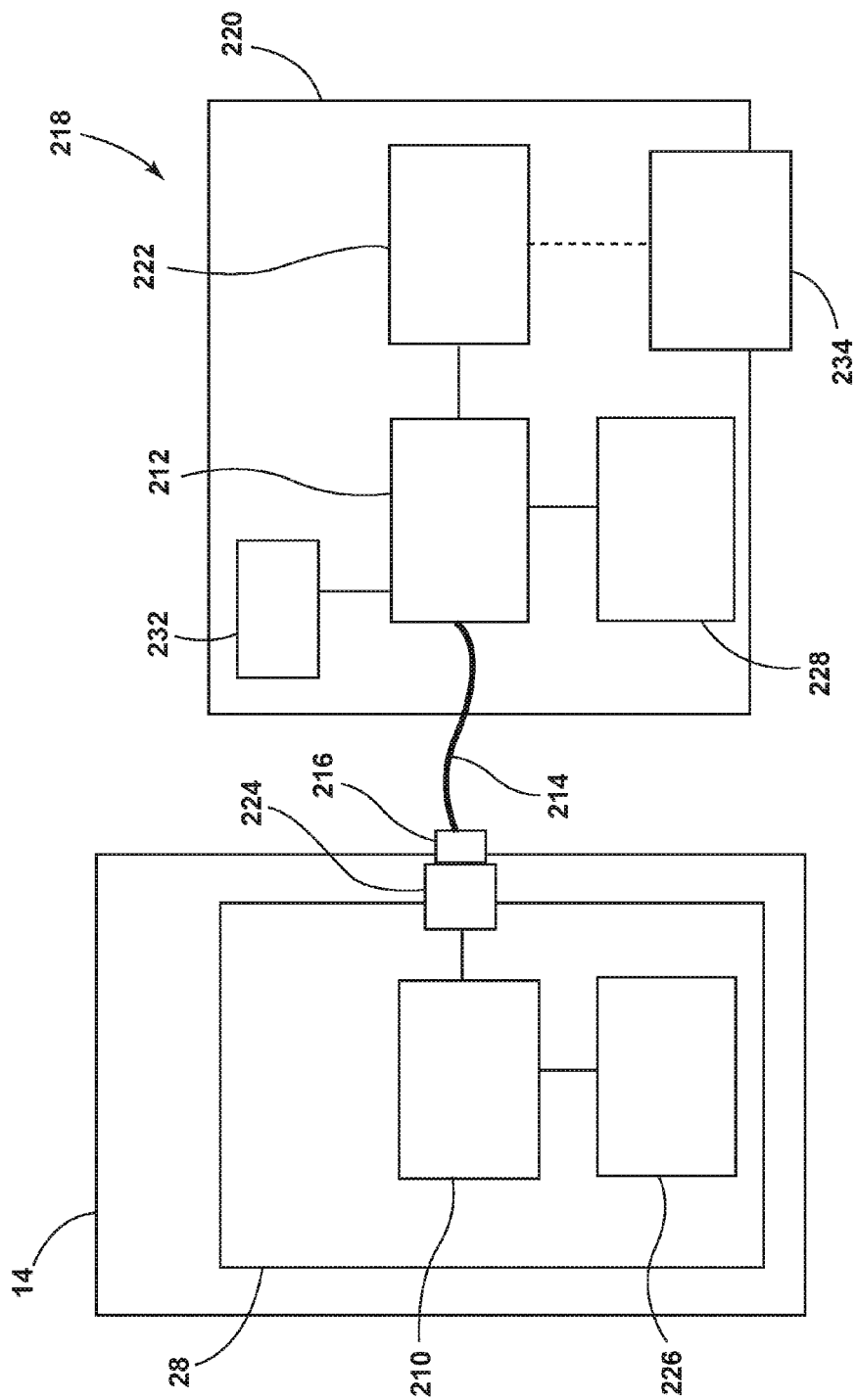
FIG. 8 is a schematic view of a remote steering input apparatus that can be used in connection with the system of FIG. 1.

As illustrated in FIG. 8, vehicle 14, including system 10, as described above, may include a variation of steering input apparatus 218 that can be a remote unit (as shown in FIGS. 8, 10, 11A-15) coupled to the controller 28 in a wired or wireless manner. In general, input device 218 can function similar to input device 18, described above, and can include a rotatable knob 230 (FIG. 10) similar to that shown in FIGS. 5 and 6. As such, the steering input device 218 provides the controller 28 with information defining the commanded path 114 of travel of the trailer 12 to the controller 28 (i.e., trailer steering information).

As discussed above, there are benefits to a steering input apparatus 218 discussed in configured to be self-contained and physically detached from or detachable from vehicle 14. Specifically, steering input apparatus 218 may allow a driver of the vehicle to position or hold the steering input apparatus 218 at a location and/or orientation that is preferable to them. Accordingly, such a self-contained and selectively positionable steering input apparatus 218 allows a driver to dictate its placement so as to optimize the overall effectiveness and preference in operation of the TBA system of the vehicle. In this manner, steering input apparatus 218 can overcome the abovementioned adverse issues that can result from alternative steering input apparatuses (e.g. input device 18 of FIG. 5) being permanently mounted on the vehicle at a specific fixed location.

In one embodiment, shown schematically in FIG. 8, the steering input apparatus 218 is a detachable driver interface that is connected to the TBA system 10 either wirelessly or through a wired connection. For example, such a detachable steering input apparatus 218 can be self-contained and selectively positionable at one or more locations of the vehicle 14 (e.g., a dedicated apparatus that is an original equipment manufactured (OEM) supplied apparatus). In one implementation, the detachable steering input apparatus 218, the detachable steering input apparatus 218 is configured to fit into a cup holder when in use and then removed when not in use (e.g., a housing of the detachable the trailer backup steering input apparatus is complementary to that of the cup holder). In another embodiment, the trailer backup steering input apparatus is a standalone driver that is connected to the TBA system either wirelessly or through a wired connection. For example, such a standalone apparatus can be self-contained device that has no physical interconnection with any portion of the vehicle (e.g., a dedicated apparatus that is an original equipment manufactured (OEM) supplied apparatus, a smartphone having a TBA path of travel command application running thereon, or the like). Wirelessly, such connection can be implemented using a WIFI, Bluetooth, or other suitable wireless protocol to provide a signal corresponding to a driver inputted trailer path of travel altering commands to the controller of the TBA system. A wired connection could connect through a USB, Serial, or other suitable connection port of the controller of the TBA system.

Regardless of the specific configuration of such a self-contained trailer backup steering input apparatus (e.g., knob, slider, button(s), touchscreen, etc), the trailer backup steering input apparatus will include a means for the driver to provide input on which direction the driver wants to "steer" a trailer attached to their vehicle. In this regard, the trailer backup steering input apparatus is configured for enabling the driver of a vehicle to input trailer path altering commands (i.e., a command that causes the TBA to alter a path of travel of the trailer). As discussed above in reference to FIGS. 2 and 3, such commands influence a direction in which, magnitude at which, and rate at which a path of travel of the trailer changes.

Referring now to FIGS. 1 and 8, the controller 28 and the steering input apparatus 218 can be jointly configured for allowing a driver of the vehicle 14 to selectively connect the steering input apparatus 218 to the controller 28 and to selectively position the steering input apparatus 218 with respect to an interior space of the vehicle 14 (e.g., relative to the driver seat). As shown in FIG. 8, in one embodiment directed to the steering input apparatus 218 being self-contained and selectively placeable (e.g., located at a user defined position, located at a plurality of vehicle manufacturer defined positions, and the like), the controller 28 includes a signal interface 210 and the steering input apparatus 218 includes a signal interface 212. Through these signal interfaces 210, 212, a trailer steering information signal can be provided by the steering input apparatus 218 to the controller 28. In this regard, trailer steering information inputted at the steering input apparatus 218 by the driver of the vehicle 14 is transmitted from the steering input apparatus 218 for reception by the controller 28.

In a wired interconnection arrangement of the controller 28 and the steering input apparatus 218, the signal interfaces 210, 212 are jointly configured for being connected through a cable 214 or similar signal carrying structure. A first end of the cable 214 is electrically connected through the signal interface 212 to signal generating circuitry 222 of the steering input apparatus 218. A connector 216 at a second end of the cable 214 is selectively connectable to a mating connector 224 of the controller 28 for enabling the steering input apparatus 218 to be selectively connected to and disconnected from the controller 28. The signal generating circuitry 222 is configured for generating a signal as a function of driver inputted commands for causing a path of travel of the trailer 12 to be altered (e.g., as discussed above in reference to FIGS. 6 and 7).

In a wireless interconnection arrangement of the controller 28 and the steering input apparatus 218, the controller 28 has a wireless signal transceiver 226 of the vehicle 14 connected thereto and the steering input apparatus 218 has a wireless transmitter 228 coupled to the signal interface 212 thereof. The signal interfaces 210, 212 are jointly configured for enabling a signal to be wirelessly transmitted from the steering input apparatus 218 to the controller 28. For enabling such wireless communication, the wireless signal transceiver 226 and the wireless transmitter 228 are configured for signal transmission therebetween via any suitable wireless protocol (e.g., WIFI, Bluetooth, etc). In such a wireless implementation, the cable 214 and associated connectors 216, 224 can be omitted, can be retained for use as an auxiliary interconnect means with respect to the wireless interconnect means, or can be retained in various forms for use in charging an internal battery 232 within steering input apparatus 218 for providing power thereto, as discussed further below.

The housing 220 of the steering input apparatus 218 includes the signal interface 212, the signal generating circuitry 222, the wireless transmitter 228, and a user interface 234 mounted thereon (e.g., housed therein). A driver of the vehicle 14 uses the user interface 234 for inputting trailer path altering commands. In the examples of steering input apparatus 218 illustrated in FIGS. 10-15, and described further below, the user interface 234 includes a rotatable knob 230 that is similar in operation to knob 30 of the input device 18 discussed above with respect to FIGS. 5 and 6. Other examples of user interfaces 234 include, but are not limited to, a slider, one or more buttons, a touchscreen, and/or the like. Through such mounting of the signal interface 212, the signal generating circuitry 222, the wireless transmitter 228, and the user interface 234 on the housing 220, and through the housing 220 being selectively detachable from the vehicle 14 or an otherwise non-integral component of the vehicle 14 (e.g., a discrete and selectively placeable unit with respect to the vehicle 14), the steering input apparatus 218 is self-contained and is able to be selectively placed by a driver of the vehicle 14 with respect to a structure to which the controller 28 is mounted.

Figure 9:
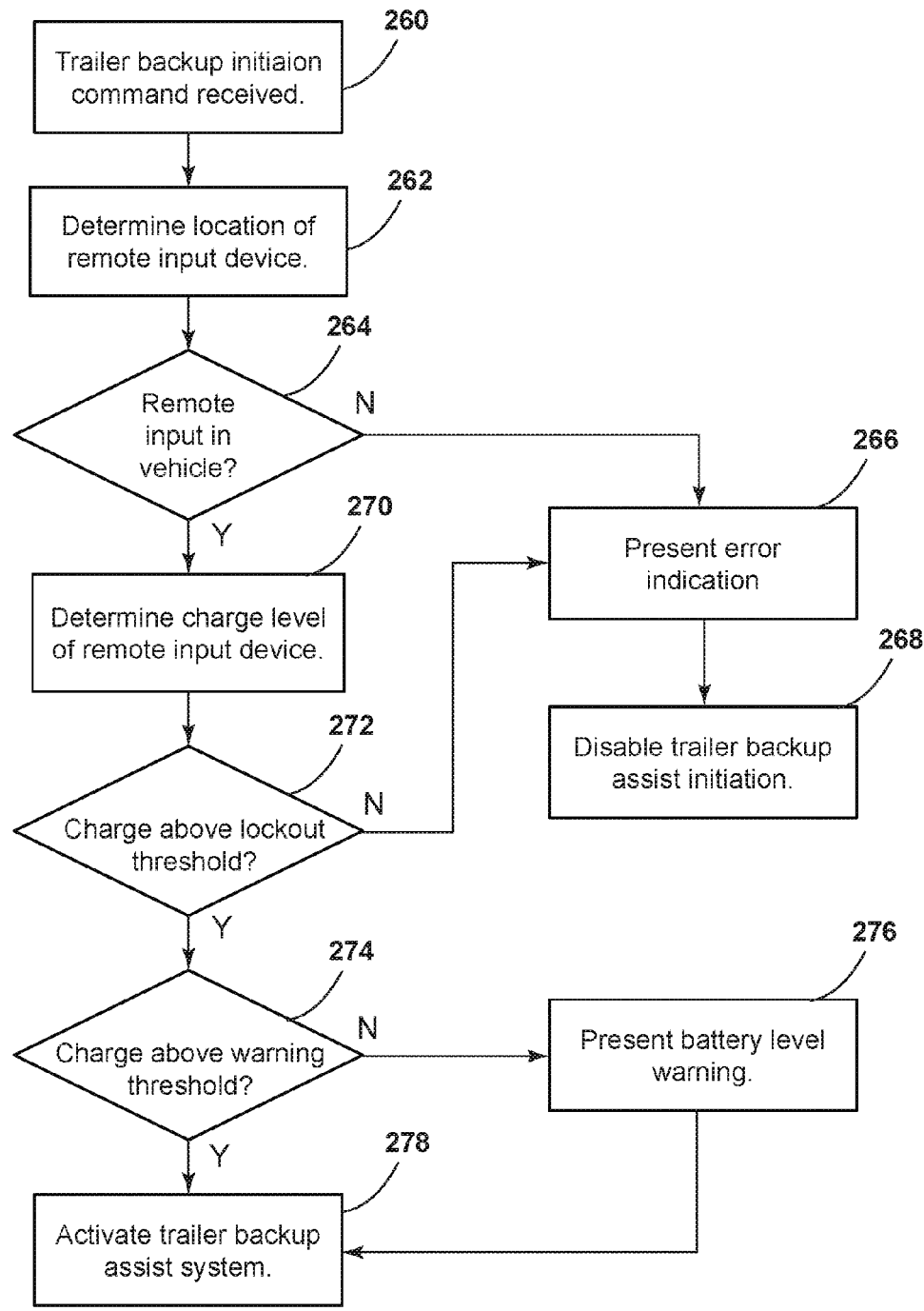
FIG. 9 is a flow diagram illustrating a control scheme for managing the use of the remote steering input apparatus of FIG. 8 based on various states thereof.
Figure 10:
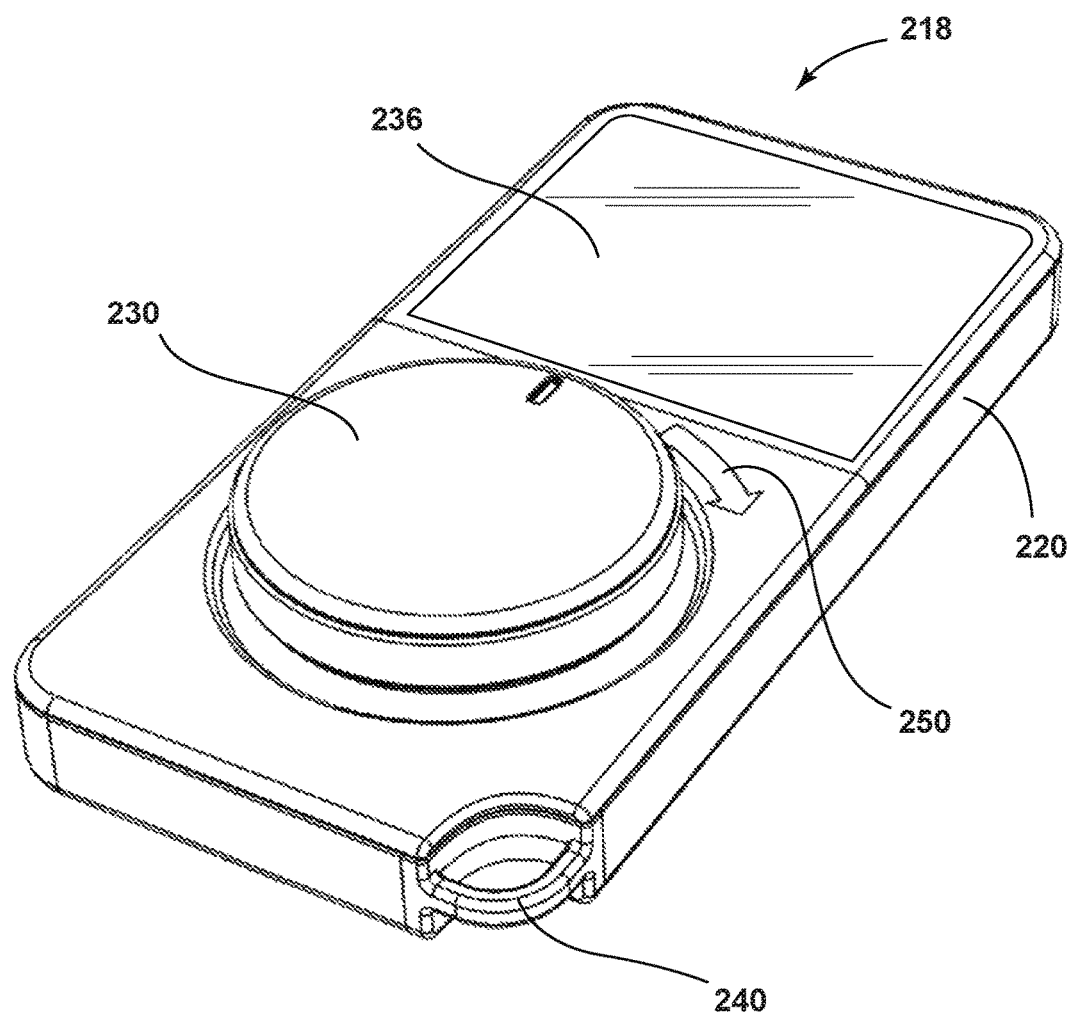
FIG.10 is a perspective view showing an embodiment of the remote steering input apparatus according to the schematic depiction of FIG. 8.

In connection with the above-described variation of the steering input apparatus 218 in which a wireless connection is implemented, controller 28 may be programmed or otherwise configured to manage the use of steering input apparatus 28 in implementing a curvature routine 98 or otherwise being used during controlling of vehicle 14, depending on various detected states thereof. In particular, controller 28 may be configured to restrict the use of steering input apparatus 28 in controlling vehicle 14 by preventing system 10 from activating or otherwise implementing curvature routine 98 under certain conditions. As illustrated in FIG. 9, controller 28 may check for certain states of steering input apparatus 218 upon receiving an initiation command (step 260). As shown in step 262, controller 28 may first determine or infer whether steering input apparatus 218 is physically present within vehicle 14, requiring that steering input apparatus 218 and, generally, a driver of vehicle 14 be present within vehicle 14 before activating. Such a requirement may be useful when, as described above, the use of system 10 in assisting reversing of trailer 12 includes the driver commanding a vehicle-trailer curvature using steering input apparatus 218, such that controller 28 actually controls the vehicle steering system 62, while the driver manually controls the speed of vehicle 14 using the vehicle throttle and brakes. Accordingly, while the decoupling of steering input apparatus 218 from vehicle 14 may allow a curvature command to be entered from outside of vehicle 14, it is not possible to actually use such an implementation of system 10 from outside of vehicle 14.

When a user attempts to activate system 10 and/or curvature routine 98, which may be done using vehicle HMI 80, or using steering input apparatus 218, such as by using knob 230, controller 28 may communicate, or seek to communicate, with steering input apparatus 218 to determine the presence thereof within vehicle 14. In one example, wireless transmitter 228, or other circuitry within vehicle 14 may include one or more proximity-based sensors or transmitters. In one example, such circuitry may be similar to those used in key fobs of vehicles having keyless, pushbutton start mechanisms. In a similar manner, circuitry within wireless transmitter 228 and wireless transceiver 226 can determine whether or not the steering input apparatus 218 is present within vehicle 14 by determining whether steering input apparatus 218 is within a predetermined range of controller 28 or another feature of the interior of vehicle 14. In other variations, controller 28 may assess the signal strength between wireless transmitter 228 and wireless transceiver 226 to determine the distance between steering input apparatus 218 and wireless transceiver 226 to infer a presence of steering input apparatus 218 within vehicle 14. Further, controller 28 can be configured to disable system 10 and/or curvature routine 98 when no signal is received from steering input apparatus 218. Additionally, controller 28 may communicate with a weight-based sensor within the driver seat of vehicle 14 to determine if a driver is present within vehicle 14 to further ensure proper use of system 10, including disabling system based on an occupancy state of the driver seat of vehicle 14 (i.e. when the driver seat is unoccupied).

As shown in FIG. 9, controller 28, upon detecting that steering input apparatus 218 is not in vehicle 14 (or is far enough from wireless transceiver 226, for example, to infer that steering input apparatus 218 is not in vehicle 14), can present an error indication (step 266). The error indication can be presented visually, either on vehicle HMI 80 or on a display 236 (FIG. 10) on the interface 234 of steering input apparatus 218, or audibly through vehicle HMI or steering input apparatus 218 (which may include an embedded speaker). Further such an error indication may be presented by haptic feedback through steering input apparatus 218, which may include an embedded vibration unit and/or may employ a haptic knob 230 such as that which is described in detail in co-pending, commonly-assigned U.S. patent application Ser. No. 14/813,642, the entire disclosure of which is incorporated herein. A visual error indication may specifically alert the user of steering input apparatus 218 to the fact that the driver and steering input apparatus 218 are required to be within vehicle 14 to use system 10. Subsequently, system 10 and/or curvature routine 98 may be deactivated or disabled (step 268) with controller 28 waiting for a further initiation signal (step 260) before again determining the location of steering input apparatus 218 (step 262).

If controller 28 determines that steering input apparatus 218 is present within vehicle 14 (and, optionally, that the vehicle 14 driver seat is occupied), controller 28 can then communicate with steering input apparatus 218 to determine a charge level of battery 232 (step 270) that is used to power steering input apparatus 218. In particular, controller 28 may be configured to prevent use of steering input apparatus 218 to control the backing path of vehicle 14 if the charge level of battery 232 is insufficient to reliably complete, or otherwise carry out, a trailer backing operation. In other words, controller 28 may require that the charge level or battery 232 is sufficient to power steering input apparatus 218 for a time period corresponding to at least an average trailer backing operation. Alternatively, controller 28 may require that the charge level or battery 232 is sufficient to power steering input apparatus 218 for a time period corresponding to an average trailer backing operation, plus a safety factor, or corresponding to a statistically long trailer backing operation. In various examples, controller 28 may require a charge level of battery 232 sufficient to operate steering input apparatus 218 for at least 45 seconds, or in an embodiment, at least one minute, or at least 3 minutes or more.

In the implementation depicted in FIG. 9, controller 28, upon determining the charge level of battery 232, may first determine whether the charge is above a lockout threshold (step 272) corresponding to the above-described requirements for reliably powering steering input apparatus 218 through a trailer backing operation. If the charge level of battery 232 is below this threshold level, an error indication is, again, presented (step 266). As above, the error indication can be presented visually, either on vehicle HMI 80 or on a display 236 (FIG. 10) on the interface 234 of steering input apparatus 218, or audibly through vehicle HMI 80 or steering input apparatus 218 (which may include an embedded speaker). Further such an error indication may be presented by haptic feedback through steering input apparatus 218, which may include an embedded vibration unit and/or may employ a haptic knob 230. A visual error indication may specifically alert the user of steering input apparatus 218 to the fact that the battery charge level is too low to reliably use system 10, and to request that the user recharge or replace battery 232 (as applicable depending on the type of battery used and the configuration of steering input apparatus 218). Subsequently, system 10 and/or curvature routine 98 may be disabled (step 268) with controller 28 waiting for a further initiation signal (step 260) before again determining the location of steering input apparatus 218 (step 262) and, subsequently, the charge level of battery 232 (step 270).

If the charge level of battery 232 is determined in step 272 to be above the lockout threshold, controller 28 can, subsequently, determine (step 274) if the charge level of battery 232 is, nevertheless, below a predetermined warning threshold. This warning threshold can, for example, be within 10%, 15%, or 20% of the lockout threshold such that limited use is available prior to a lockout condition being reached. As such, if the charge level of battery 232 is below the warning threshold, controller 28 can cause a warning (step 278) to be presented indicating that, for example battery charging or replacement is recommended after the present use of steering input apparatus 218, while controller 28 allows system 10 to be activated (step 278). If the charge level of battery 232 is above the warning level, controller 28 continues to activate system 10 without such warning, with the driver using steering input apparatus 218 to command a curvature according to the process described above.

Turning now to FIGS. 10-15, a particular embodiment of steering input apparatus 218, including control knob 230 is illustrated that can be used to control vehicle 14 in reversing a trailer 12 based on a trailer control command, such as along a curvature path 26 by adjusting the desired trailer control command according to a particular, selectable command position. In an embodiment, the trailer control command may be a particular curvature path 26 according to the manner discussed above with respect to FIGS. 5-7. In particular, knob 230 can be used to adjust curvature path 26 by turning knob 230 against a biasing torque away from the at rest position P(AR) within either the left range of motion R(L) or a right range of motion R(R) (FIGS. 12A and 12B) extending away therefrom. Such a knob 230 can also be used in this manner to adjust a controlled hitch angle γ of trailer 12 relative to vehicle 14 using the same type of center-biased movement in connection with a backup assist system that is angle-based, rather than curvature based. As discussed further in the above-referenced U.S. patent application Ser. No. 14/813,642, knob 230 may also provide for rotation and/or other movement thereof according to additional movement modes that may allow knob 230 to be used in connection with other inputs and systems within vehicle 14.

With reference to FIGS. 11A, 11B, 12A and 12B, control of vehicle 14 in reversing trailer 12 using an embodiment of knob 230 is described with additional reference to FIGS. 6 and 7. In particular, knob 230 (or a button included thereon) may be depressed in direction 248 to activate the curvature routine 98 for reversing of trailer 12 using vehicle 14. In various embodiments, interface 234 may be configured to indicate that system 10 is ready to start curvature routine 98, such as by illumination of all or a portion of knob 230 or of a message presented on display 236. Once system 10 has been activated, knob 230 may be rotated away from the at rest position P(AR), such as within the left range of motion R(L) or the right range of motion R(R), with controller 28 interpreting the rotated position of control element 230 as a curvature command position. By way of example, the illustrated positions of control element 230 correspond to the at rest position P(AR) in FIG. 12A and, in FIG. 12B to one of the various adjusted curvature paths 120 shown in FIG. 6. In this manner, and as further discussed above with reference to FIG. 6, controller 28 may, accordingly, control the steering of vehicle 14 to maintain trailer 12 along the desired path that corresponds to a particular instantaneous position of knob 230. As further shown, an indicator 244,250 may be provided on interface 234, for example, to indicate the direction of rotation of control element 230 (e.g. within the right range of motion R(R) and that the corresponding direction within which curvature path is implemented (i.e. corresponding to the instantaneous position of control element 230).

Additionally, knob 230 can be configured to communicate that the curvature corresponding to the rotated position of control element 230 can be implemented by system 10, such as according to the parameters discussed above, including based on a determination if the commanded curvature path would lead the trailer 12 to a hitch angle γ that is beyond the maximum steerable angle, for example. For example, a warning may be presented on display 236 to communicate to the user that curvature routine 98 has determined that a commanded curvature could not be implemented and, accordingly, that the actual curvature path for trailer 12 deviates from the selected curvature command 26. Additional haptic warnings or limits of the rotation of knob 230 can be implemented according to such a determination, as also discussed further in the above-referenced U.S. patent application Ser. No. 14/813,642.

As further illustrated in FIGS. 10-15, steering input apparatus 218 can be configured, as discussed above, as a stand-alone, wireless unit that can be hand-held by user in controlling the backing path of vehicle 14 reversing trailer 12. Steering input apparatus 218 can include outer housing 220 concealing and retaining battery 232, signal interface 212, signal generating circuitry 222, and wireless transmitter 228. Interface 234 including a display 236 (which may be a video display such as a liquid crystal display (LCD), light-emitting diode (LED), organic light emitting diode (OLED), thin film transistor (TFT), or the like) and knob 230 can be mounted on housing 220 so as to be externally visible and accessible for use and interaction with by a user. Further, knob 230 and display 236 can be in communication with signal generating interface 222 and wireless transmitter 228, either directly or through additional circuitry, including a microprocessor, application-specific integrated circuit (ASIC) chip, or the like. In an embodiment, steering input apparatus 218 can be configured to act as a key fob for vehicle 14, such as by including a loop 240 for attachment of steering input apparatus 218 with a keyring or the like, and by incorporation of additional functionality for locking/unlocking vehicle 14, which may be implemented using knob 230 or by including additional buttons (not shown) on the exterior of housing 220.

Figures 14, 15:
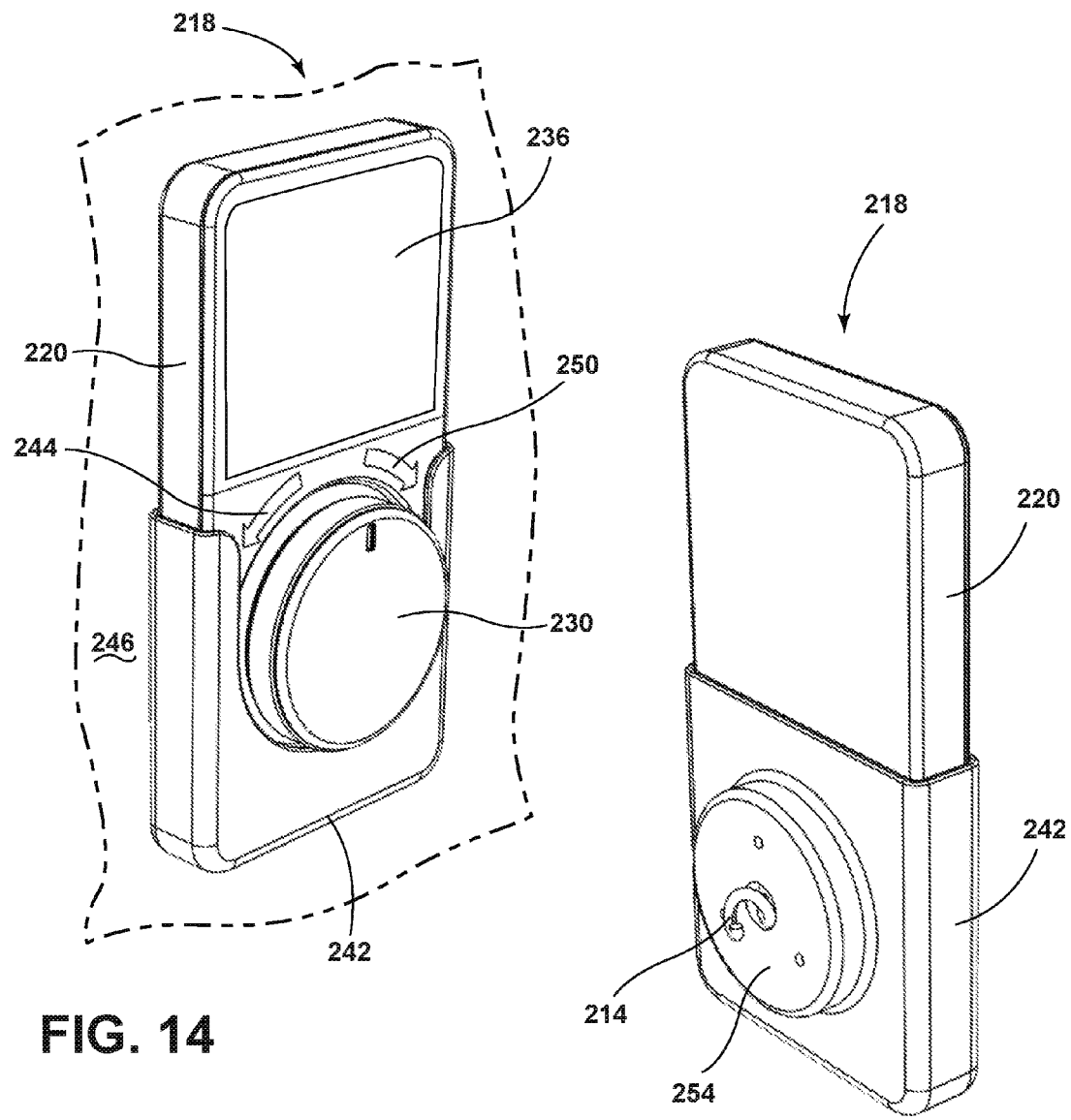
FIG. 14 is a perspective view of the remote steering input apparatus in combination with a cradle mounted in a vehicle.
FIG. 15 is a rear perspective view of the remote steering input apparatus and cradle combination of FIG. 13.

As shown in FIG. 13, steering input apparatus 218 may be paired with a retention and/or charging receptacle shown in the form of a cradle 242 or the like that can be mounted within vehicle 14 to retain steering input apparatus 218 when not in use. In an embodiment, cradle 242 can include a mating connector, such as the connector 224 that is depicted schematically in FIG. 8. To couple a portion of cable 214 that is connected with vehicle 14 with steering input apparatus 218 to provide power for charging of a rechargeable variation of battery 232. In an embodiment, steering input apparatus 218 can include a connector 216 that couples therewith to connect steering input apparatus 218 with cable 214 (FIG. 15). In one variation, connector 216 and mating connector 224 can be inductive charging devices such that the coupling achieved therebetween is electrical only, with no physical coupling or other connection being needed to charge battery 232 using cradle 242 (or a charging mat within vehicle 14 that may replace cradle 242). In other variations, physical connections or couplings can be incorporated on housing 220 and within cradle 242 to achieve physical and electrical coupling of battery 232 (and other internal components, as applicable) when steering input apparatus 218 is received within cradle 242.

As shown in FIG.14, cradle 242 may be mounted on a portion of the interior of vehicle 14, which may be, for example, a portion of console 246 (which may be similar to portions of console 108 depicted in FIG. 5, for example). In particular, cradle 242 may be mounted within a compartment of console 246 (or within a glove compartment or the like) so that steering input apparatus 218 is out of view and/or reach when out of use and/or charging. Alternatively, cradle 242 may be positioned along (or integrated with) a portion of console 246 that is generally accessible to a driver of vehicle 14 such that steering input apparatus 218 can be used when in cradle 242, if it is comfortable or desirable by the driver, or removed from cradle 242, if so desired (so long as the charge level of battery 232 is acceptable and the steering input apparatus 218 is within vehicle 14, per the control scheme depicted in FIG. 9 and discussed above). In such a variation, the control scheme of FIG. 9 would be bypassed when steering input apparatus 218 is known by controller 28 to be within cradle 242. As shown in FIG. 15, cable 214 may extend through a mounting portion 254 of cradle 242 to extend through console 246 (or other vehicle structure) to couple with vehicle 14, such as through controller 28 or another system thereof, as needed, to provide power from a power source of vehicle 14 therethrough and/or an optional wired interface with steering input apparatus 218.

Figure 16:
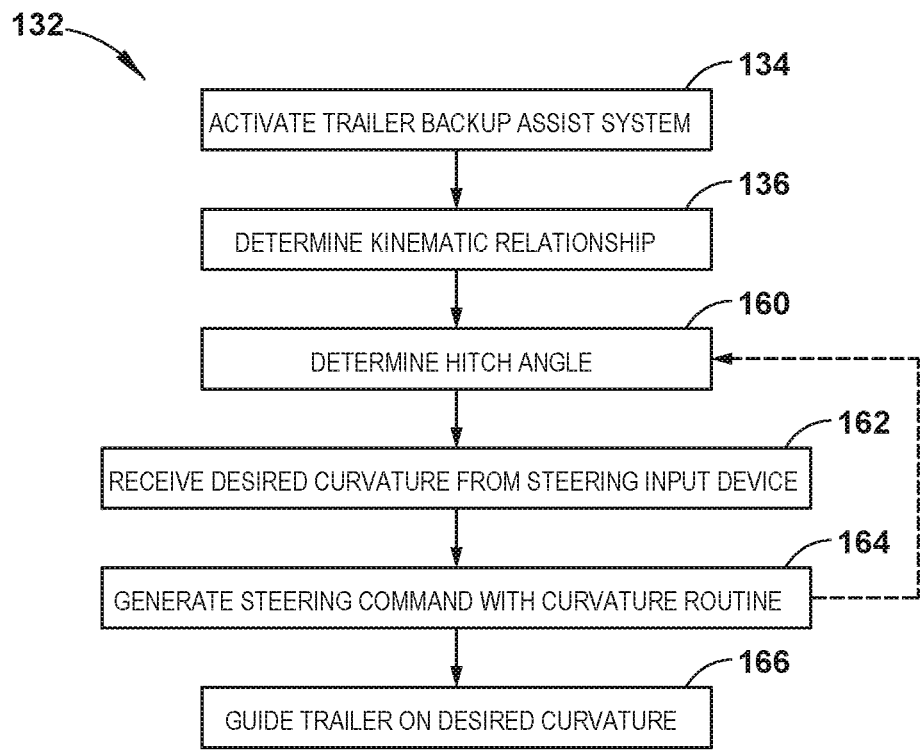
FIG. 16 is a flow diagram illustrating a method of estimating a hitch angle using a hitch angle estimation routine.

With reference to FIG. 16, a method of operating one embodiment of the trailer backup assist system 10 is illustrated, shown as one embodiment of the operating routine 132 (FIG. 2). At step 134 the method is initiated by the trailer backup assist system 10 being activated. It is contemplated that this may be done in a variety of ways, such a making navigating through a menu sequence on display 82 of the vehicle HMI 80 and confirming an initiation of the routine 132 using knob 30 or 230, as discussed above. The next step 136 then determines the kinematic relationship between the attached trailer 12 and the vehicle 14. To determine the kinematic relationship, various parameters of the vehicle 14 and the trailer 12 must be sensed, input by the driver, or otherwise determined for the trailer backup assist system 10 to generate steering commands to the power assist steering system 62 in accordance with the desired curvature or backing path 26 of the trailer 12. As disclosed with reference to FIGS. 3-6, the kinematic parameters to define the kinematic relationship include a length of the trailer 12, a wheel base of the vehicle 14, a distance from a hitch connection to a rear axle of the vehicle 14, and a hitch angle γ between the vehicle 14 and the trailer 12, among other variables and parameters as previously described. Accordingly, after the kinematic relationship is determined, the trailer backup assist system 10 may proceed at step 160 to determine the current hitch angle by processing the hitch angle estimation routine 130.

It is to be understood that variations and modifications can be made on the aforementioned structure without departing from the concepts of the present invention, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A steering input system for a trailer backup assist system, comprising:
   an input apparatus, including:
      a housing; and
      a user-manipulable input element coupled with the housing; and
   a controller:
      detecting a predetermined state of the input apparatus and determining if the predetermined state meets a corresponding activation requirement;
      only when the predetermined state meets the corresponding activation requirement, implementing a trailer backup assist mode including generating a vehicle steering command based on an instantaneous position of the input element; and
      preventing implementation of the trailer backup assist mode when the predetermined state does not meet the corresponding activation requirement.

2. The steering input system of claim 1, wherein:
   the first predetermined state of the input apparatus is a location of the input apparatus with respect to a vehicle associated with the trailer backup assist system; and
   the corresponding activation requirement is presence of the input element in the vehicle.

3. The steering input system of claim 2, wherein:
   the input apparatus is physically detached from the vehicle and in electronic communication with the controller by a wireless transmitter; and
   the controller determines the predetermined state of the input apparatus using a proximity sensor configured for communication with the input apparatus.

4. The steering input system of claim 1, wherein:
   the input apparatus includes a battery within the housing for providing power to the apparatus;
   the predetermined state of the input apparatus is a charge level of the battery; and
   the corresponding activation requirement is the charge level of the battery being greater than a predetermined minimum charge level to reliably carry out a trailer backup assist routine.

5. The steering input system of claim 4, wherein one of the controller or the input apparatus presents a battery charge level warning when the charge level of the battery is below a warning threshold that is above the predetermined minimum charge level.

6. The steering input system of claim 5, wherein the battery charge level warning is one of an audible signal, a visual indication, and a haptic indicator.

7. The steering input system of claim 1, wherein the input apparatus is a discrete unit in electrical communication with the controller to transmit the first instantaneous position of the input element to the controller.

8. The steering input system of claim 1, wherein the input apparatus further includes a display in communication with the controller for presenting information to a user regarding at least one trailer backup assist mode function.

9. The steering input system of claim 1, wherein the input apparatus further is included within a key fob associated with a vehicle including the steering input system.

10. The steering input system of claim 1, further including a charging receptacle selectively receiving the input apparatus and in communication with a power source of a vehicle including the steering input system, wherein:
    the input apparatus further includes a rechargeable battery electrically coupleable with a portion of the charging receptacle to charge the battery.

11. The steering input system of claim 1, wherein the user-manipulable input element is a rotary element biased toward an at-rest position and rotatably coupled with the housing; and
    when implementing the trailer backup assist mode, the controller generates the vehicle steering command based on a desired curvature position corresponding to the first instantaneous position of the rotary element.

12. A backup assist system for a vehicle reversing a trailer, comprising:
- an input apparatus, including:
  - a housing; and
  - a rotary element rotatably coupled with the housing; and
- a controller:
  - detecting a predetermined state of the input apparatus and determining if the predetermined state meets a corresponding activation requirement;
  - only when the predetermined state meets the corresponding activation requirement, implementing a trailer backup assist mode including generating a vehicle steering command based on an instantaneous position of the input element; and
  - preventing implementation of the trailer backup assist mode when the predetermined state does not meet the corresponding activation requirement.

13. The system of claim 12, wherein:
the first predetermined state of the input apparatus is a location of the input apparatus with respect to the vehicle; and
the corresponding activation requirement is presence of the input element in the vehicle.

14. The system of claim 12, wherein;
the input apparatus includes a battery within the housing for providing power to the apparatus;
the first predetermined state of the input apparatus is a charge level of the battery; and
the corresponding activation requirement is the charge level of the battery being greater than a predetermined minimum charge level to reliably carry out a trailer backup assist routine.

15. A method for assisting a vehicle in reversing a trailer, comprising:
detecting a predetermined state of an input apparatus and determining if the predetermined state meets a corresponding activation requirement;
only when the predetermined state meets the corresponding activation requirement, implementing a trailer backup assist mode including generating a vehicle steering command based on an instantaneous position of an input element of the input apparatus; and
preventing implementation of the trailer backup assist mode when the predetermined state does not meet the corresponding activation requirement.

16. The method of claim 15, wherein:
the input element is a rotary element biased toward an at-rest position; and
the curvature command corresponds to a rotational position of rotation of the rotary element away from the at-rest position.

17. The method of claim 15, wherein;
the first predetermined state of the input apparatus is a location of the input apparatus with respect to the vehicle; and
the corresponding activation requirement is presence of the input element in the vehicle.

18. The method of claim 17, wherein:
the input apparatus is physically detached from the vehicle and in electronic communication with the controller by a wireless transmitter; and
determining the predetermined state of the input apparatus includes using a proximity sensor configured for communication with the input apparatus.

19. The method of claim 15, wherein:
the input apparatus includes a battery within the housing for providing power to the apparatus;
the first predetermined state of the input apparatus is a charge level of the battery; and
the corresponding activation requirement is the charge level of the battery being greater than a predetermined minimum charge level to reliably carry out a trailer backup assist routine.

* * * * *